United States Patent [19]

Griner

[11] Patent Number: 5,286,144
[45] Date of Patent: Feb. 15, 1994

[54] APPARATUS AND METHOD FOR CUTTING A HOLE IN A PIPE LINER

[76] Inventor: Ward J. Griner, 913 Northside Dr., Mt. Dora, Fla. 32757

[21] Appl. No.: 740,395

[22] Filed: Aug. 5, 1991

[51] Int. Cl.$^5$ .......................... B23B 27/00; B23C 5/02
[52] U.S. Cl. .................... 408/224; 166/55.2; 175/412; 407/30
[58] Field of Search ................. 407/30; 408/196, 225, 408/201, 209, 224; 166/55.7, 55.6, 55.2, 55; 175/401, 402, 413, 406, 412; 241/293

[56] References Cited

U.S. PATENT DOCUMENTS

| | | | |
|---|---|---|---|
| 2,786,218 | 3/1957 | Yousem | 408/224 X |
| 2,960,312 | 11/1960 | Kandle | 175/143 |
| 3,075,594 | 1/1963 | Creel | 175/412 |
| 4,197,908 | 4/1980 | Davis et al. | 166/55 |
| 4,986,314 | 1/1991 | Himmler | 166/55.7 X |

FOREIGN PATENT DOCUMENTS 791905 12/1980 U.S.S.R. .................. 175/401

Primary Examiner—William Briggs
Attorney, Agent, or Firm—Steven C. Stewart

[57] ABSTRACT

An apparatus and method for cutting a hole in a liner installed in a conduit. Included in the apparatus is a carriage and a cutting head that are rotated to cut the liner. A lateral axis extends through the carriage. A skid constrains the carriage and the cutting head. The cutting head is substantially positioned over the center of gravity of the carriage to provide stability during cutting. The cutting head moves vertically with the use of a cam. The cutter also moves laterally and may rotate about the axis when cutting the hole. Prior to cutting the hole, the skid extends outward to hold the carriage in place. The apparatus also includes a specialized cutter having cutting bars along its outside perimeter and along its top surface.

16 Claims, 6 Drawing Sheets

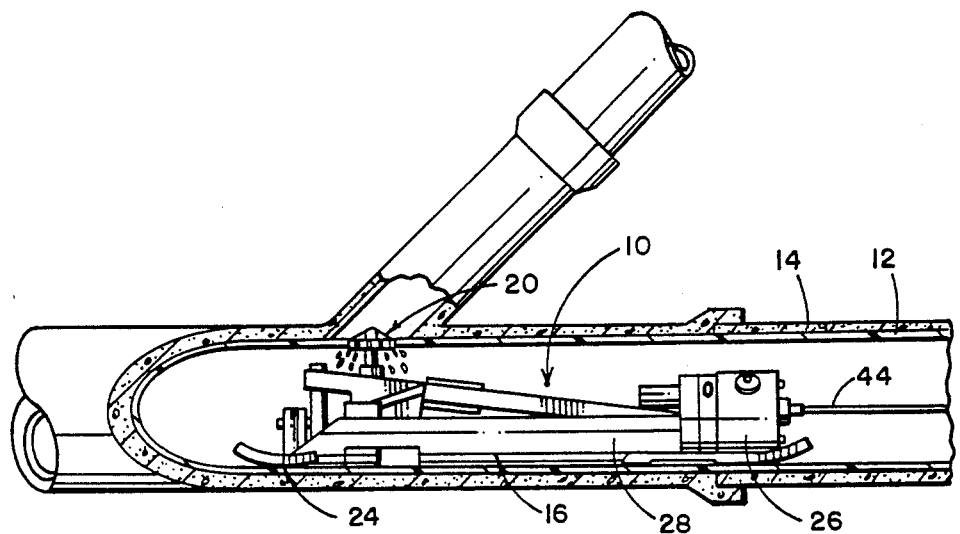
FIG. 1
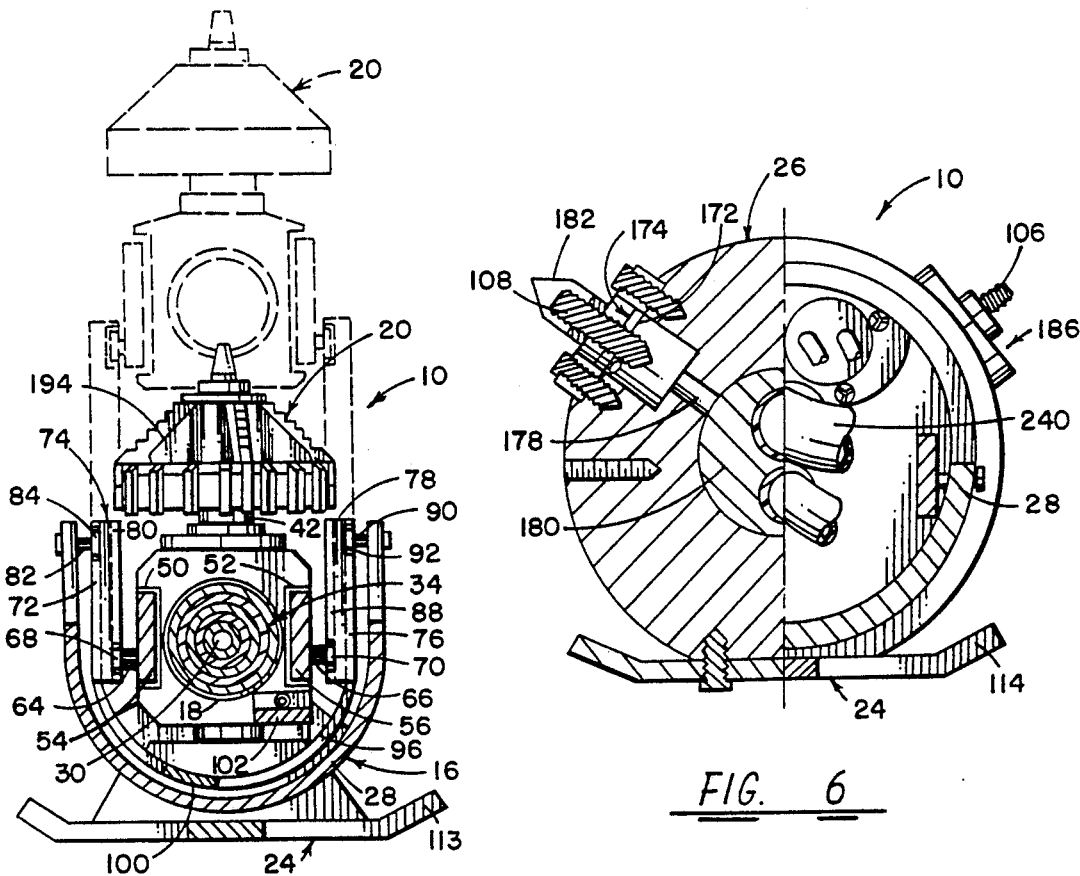
FIG. 3
FIG. 6

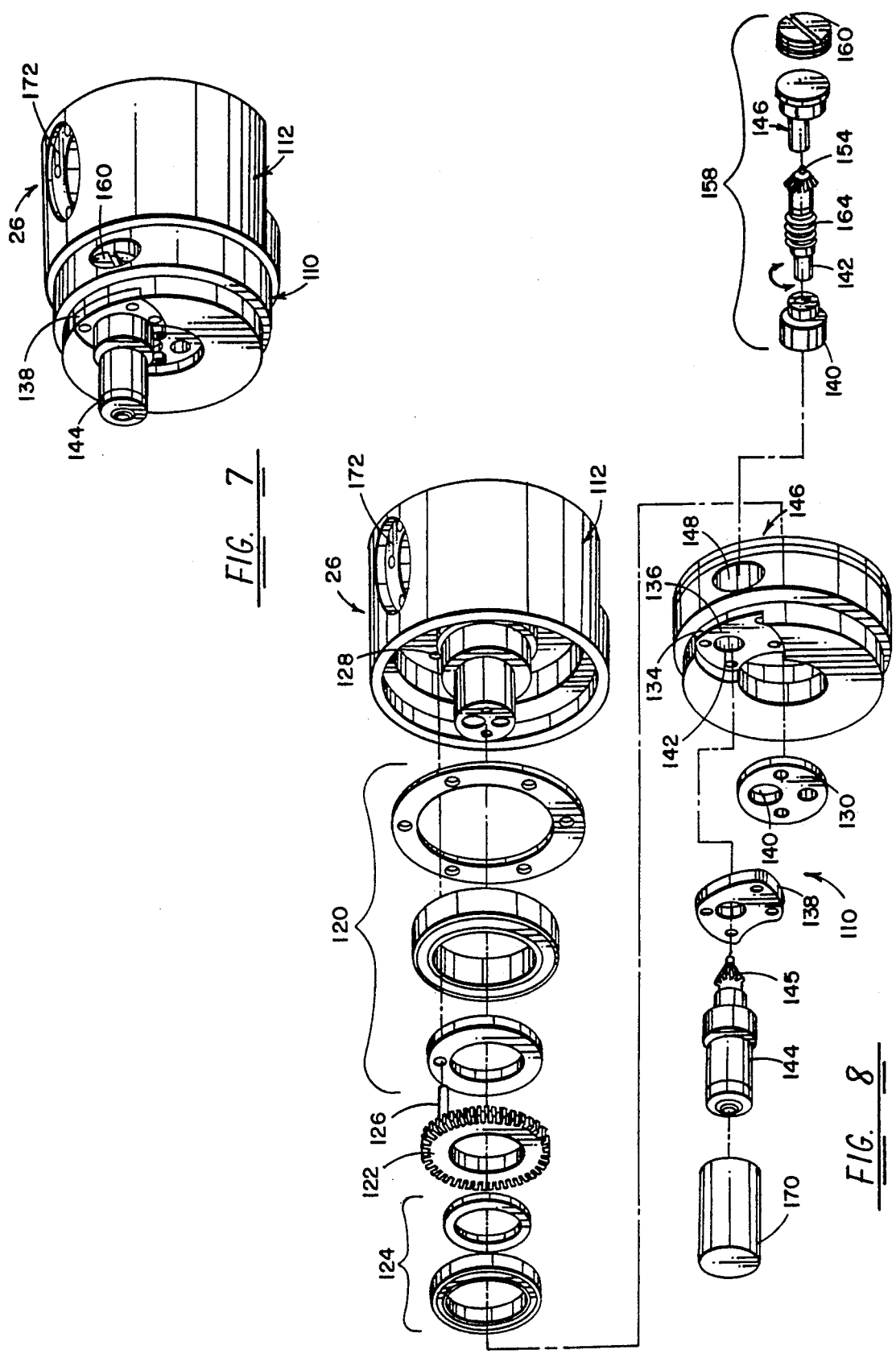

APPARATUS AND METHOD FOR CUTTING A HOLE IN A PIPE LINER

BACKGROUND OF THE INVENTION

This invention relates generally to using a remotely located device for cutting holes. More specifically, this invention relates to a method and apparatus for cutting through a liner in a conduit in order to re-establish service to lateral (incoming) lines.

It is well known that conduits that hold water sewage require repair due to leaking. This leakage may result from improper installation, deterioration due to aging, corrosive material running through the conduit, improper care, earth vibrations or other causes.

Typical leakage has been corrected by running a liner through a conduit as disclosed in U.S. Pat. Nos. 4,009,063 and 4,067,211. After the conduit has been lined, a cutter such as the ones disclosed in U.S. Pat. Nos. 4,648,454, 4,197,908, 4,701,988 or 4,422,891, is fed into the conduit to cut holes at the conduit's junctions.

These cutters have a cutter head disposed at one end and a motor that is connected to a carriage at the other end. The cutter turns rapidly while moving upward to cut a hole through the liner. A drawback to these cutters is that the cutter head may wobble while cutting, resulting in an inaccurate cut. Further, the cutter heads may not be able to exert enough force to cut away obstacles that protrude into the hole after the liner has been cut.

The locations of the junctions where the holes in the liner are to be cut may be located on the sides of the conduit. Further, the size of the hole may be large. Consequently, when the aforementioned cutters are used, they must be twisted and turned to place the cutting head in the proper orientation to cut the hole. The aforementioned cutters may not have the range of motion to cut large holes without having to stop cutting the liner, physically moving the cutter. Twisting and moving the cutters to reposition the cutting heads increases the time to cut holes in the liner which allows blocked lateral (incoming) lines to backup and possible overflow or backflow.

Another drawback to the cutters disclosed in the aforementioned patents is that they are constructed with many moving components. Except for the cutting head, prior art components are sealed in a cover to prevent contact with debris. However, debris may still seep through cracks around the cover resulting in the cutter's components corroding, thereby reducing its life expectancy.

Due to the tight space requirements of a conduit, the cutter's components must be compacted into a small region. When cutting it is desirable to cut deeply through the liner to cut away any debris or growth present in the junction. A drawback of the aforementioned cutters is that they may not have the extent of movement to allow the cutters to cut growth in the junction.

The devices described in the aforementioned patents use brakes which are connected through rams to the cutter's support structure. During operation the rams expand outward. This expansion results in the brake being pushed against the side of the liner to hold the support structure in place. A drawback to this approach is that when the cutter is to be moved to the next cutting location, the operator may occasionally forget to release the brake. Consequently, the brake may tear up the liner, or a hose connected to the support structure to move the cutter may be damaged.

Another problem with the extended brake in the prior art is that because the force exerted by the brake(s) along the liner, enough force may not be applied to one location on the liner to hold the support structure in place. Consequently, the cutter may vibrate and travel during cutting operation resulting in an inaccurate cut.

Many of the prior art devices cause debris from the liner to fall downward on the cutter during operation. This debris may clog up the cutter's moving components. Further, the debris may become entrained in the cutter's blades themselves so as to increase the time to cut the hole. Further, the prior art devices only have a limited cutting surface. Thus, the time to cut the hole is increased.

When a cutting head cuts the liner it typically cuts in two directions. First the cutting head moves upward to form a hole in the liner. Then the cutting head moves downward to spread the hole. When the cutting head moves downward it may not exert enough force to expand the hole after punching through the liner.

Finally, when the prior art cutting devices are repositioned during cutting, the operator may not react quickly enough to the movement of the cutter head to stop the cutter's reposition. Consequently, if the cutter mechanism moves too fast, it may overshoot its mark and damage the conduit or liner. This damage may result in a leaky liner.

SUMMARY OF THE INVENTION

An object of this invention is to provide an improved apparatus for cutting a hole.

A further object of this invention is to cut a hole in a liner using a cutting head centered on a carriage to increase stability during cutting.

It is also an object of this invention to cut holes in a liner by rotating the cutting head about an axis while moving the head laterally and raising and turning the cutting head to provide greater flexibility in cutting to decrease cutting time.

It is another object of this invention to provide an improved method for cutting a hole in a conduit in a pipe with greater efficiency.

An additional object of this invention is to incorporate a cam system into a cutting head that allows greater flexibility and decreased vibration in the movement of the cutting head while allowing the cutting head to be compacted into a small space.

Another object of this invention is to engage a brake to secure a carriage holding the cutting head in place while cutting and to automatically disengage the brake when cutting has been completed to prevent accidental damage to the liner.

A further object of this invention is to provide a cutting head that cuts a liner as it is moving up and moving down.

Also an object of this invention is to have a variable speed orientation control to prevent overcuts while trimming the liner while at the same time minimizing the time required to cut the liner.

It is an additional object of the invention to allow debris to flow through the cutting head during operation to prevent jamming and clogging.

An object of this invention is to cut through a liner in a conduit junction while also removing any protruding obstruction that is present in the conduit's junction after the liner is opened at the junction.

It is a further object of this invention to construct a cutting apparatus which operates in a highly moist and corrosive environment while preventing damage to the apparatus's components to extend the cutting apparatus's life expectancy.

In a preferred embodiment the apparatus is provided for cutting a hole in the liner installed in a conduit. The apparatus includes a cutting means for cutting the liner to form a hole in the conduit, means for turning the cutting means to cut the liner and carriage means for supporting the rotating means and the cutting head. A brake is incorporated into the carriage for constraining the apparatus when the head cuts the liner, the brake means extends laterally along the carriage so as to contact the liner during cutting. The brake extends laterally behind the cutting means to provide greater stability when cutting.

In another aspect of the invention, the apparatus cuts a hole in the liner installed in a conduit, the apparatus comprises a cutting means for reinstating lateral connections in a liner installed in a conduit, a carriage for supporting the cutting means while the liner is removed, and two piston brakes that extend outward from the carriage when the cutting mean is activated to prevent lateral movement of the carriage as the incoming lateral lines are reinstated to service.

It may also be preferable in another aspect of the invention the apparatus is provided for cutting a hole in the liner installed in a conduit. In this embodiment the apparatus is comprised of a cutting head on a shaft, a motor for driving the shaft, an enclosure means for supporting the motor and the cutting head, and arms slidably coupled to the enclosure means and the arm having a connecting rod with a collar. A cam is provided having a first and second side, the first side having a first guide extending diagonally across the surface of the cam and being adapted to slidably receive the collar, the second side has a second guide extending diagonally across the surface of the second side of the cam. Outer housing is slidably coupled to the second guide and means for moving the cam in the first direction and for moving the cam in the second direction opposite to the first direction is provided such that when the cam is moved in the first direction the first connecting rod slides along the first guide and the second connecting rod slides along the second guide to raise the arm.

BRIEF DESCRIPTION OF THE DRAWINGS

FIG. 1 is a perspective view of the cutting apparatus embodying the invention shown reinstating service to lateral lines in a conduit which has been lined;

FIG. 3 is a sectioned view of the cutting apparatus shown in FIG. 2 along cut 3—3 with the cutter head in its extended position being shown in phantom;

FIG. 6 is a sectioned view of the turning assembly shown in FIG. 2 along cut 6—6;

FIG. 7 is a side perspective view of the turning assembly shown in FIG. 2;

FIG. 8 is an exploded view of the turning assembly shown in FIG. 7;

DESCRIPTION OF THE PREFERRED EMBODIMENTS

Figure 2:
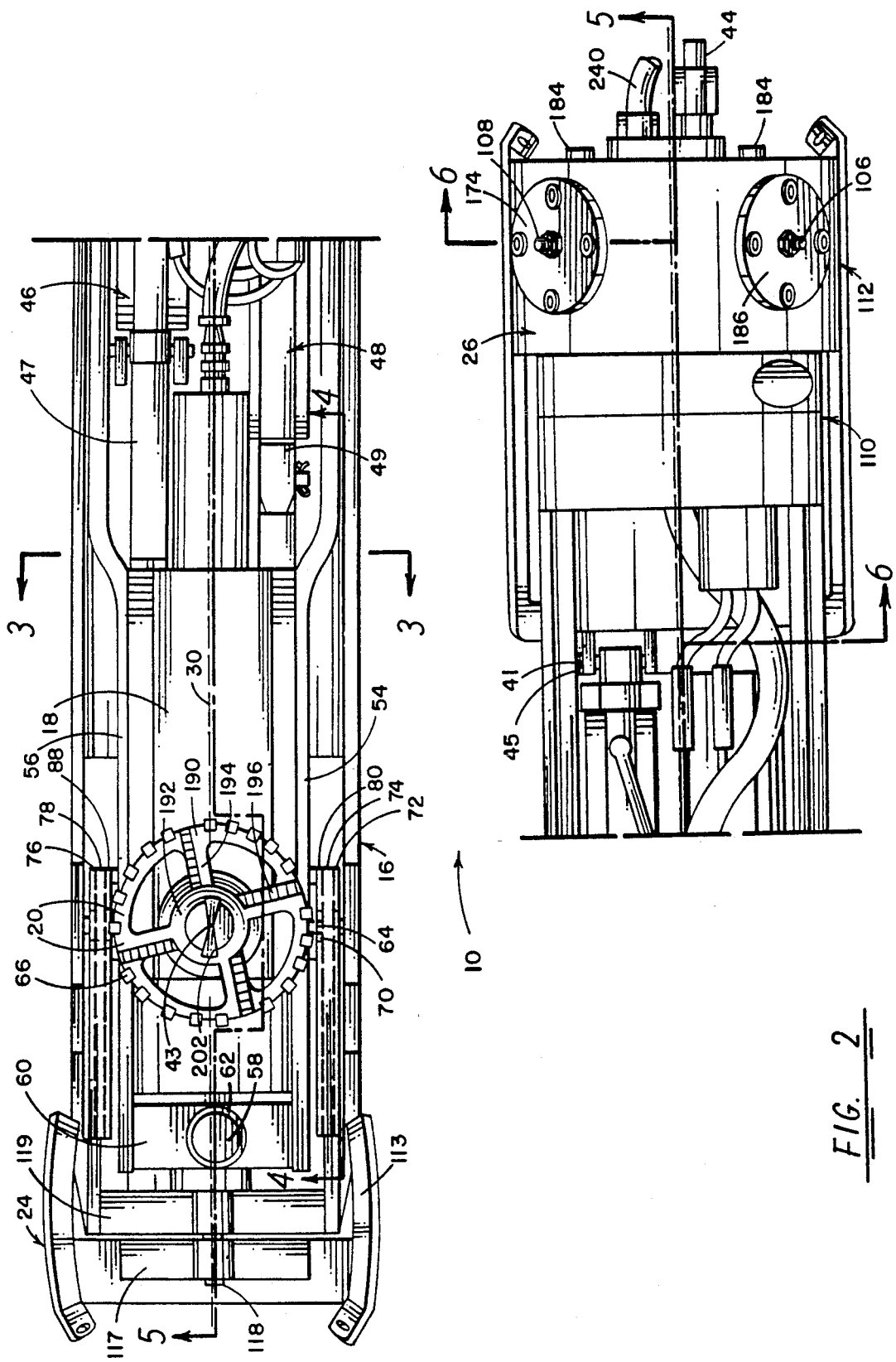
FIG. 2 is a top view of the cutting apparatus shown in FIG. 1.

Referring to FIG. 1 there is shown a cutting apparatus 10 for cutting holes in a liner 12 within a conduit 14. Referring to FIGS. 1-5, the cutting apparatus 10 includes a carriage 16 supporting an enclosure 18 that is coupled to cutting head 20. Cutting head 20 is lifted upward, moved forward or rearward, and rotates to cut liner 12.

Referring to FIGS. 1-6 and 9, carriage 16 is supported by skid assembly 24 located on the bottom of cutting apparatus 10. Referring to FIGS. 1, 2, 5 and 9, disposed on the rear portion of cutting apparatus 10, is rotation assembly 26 which is coupled to an outer housing 28 of carriage 16. Rotation assembly 26 rotates carriage 16 and cutting head 20 about an axis 30 (FIGS. 2 and 3) extending laterally through cutting apparatus 10. Disposed on the bottom of outer housing 28 below cutting head 20 is aperture 29 (see FIG. 9), which provides an escape for particles from liner to fall after being cut out of liner 12.

Figure 5:
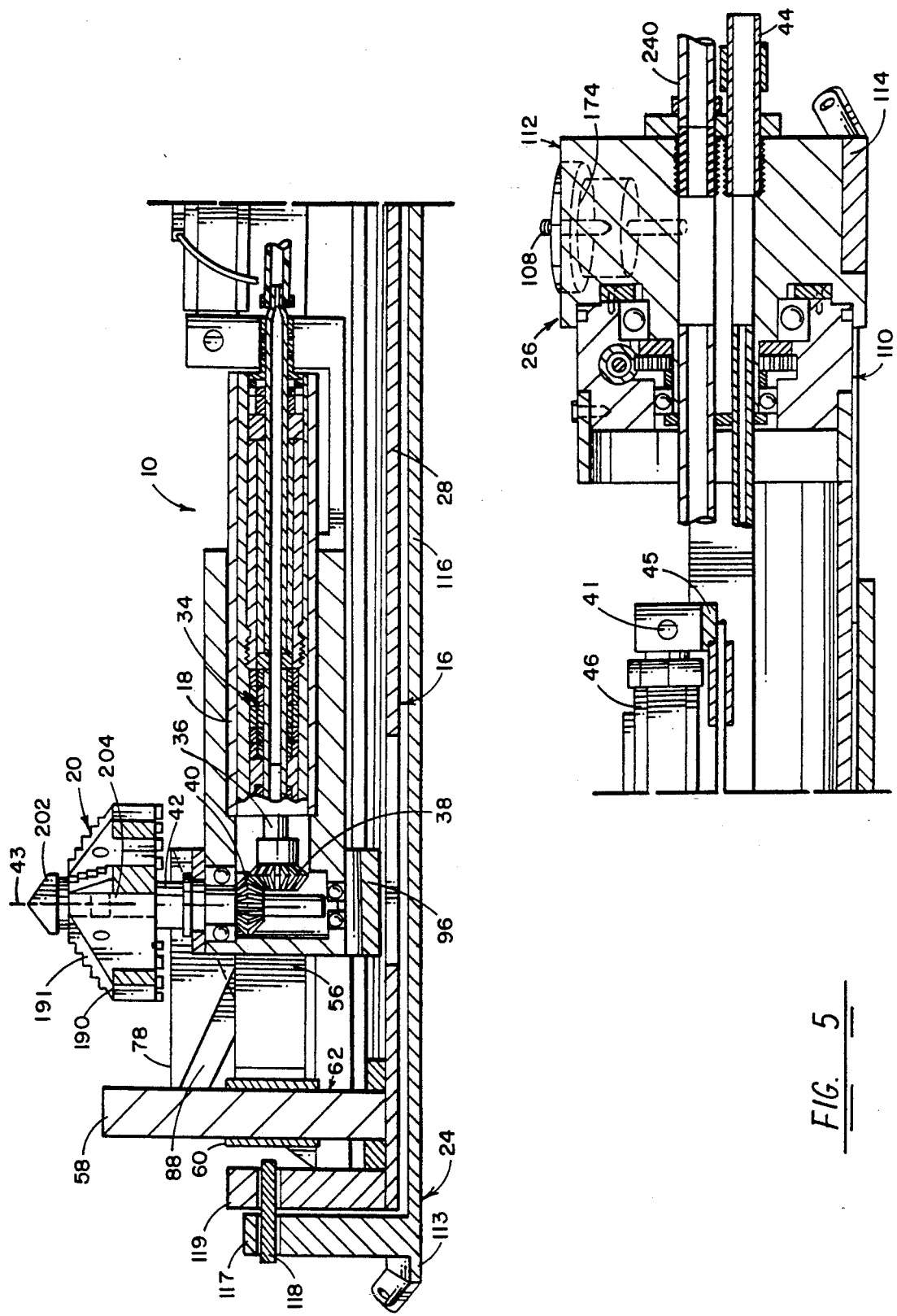
FIG. 5 is a side sectioned view of the cutting apparatus shown in FIG. 2 along cut 5—5.
Figure 9:
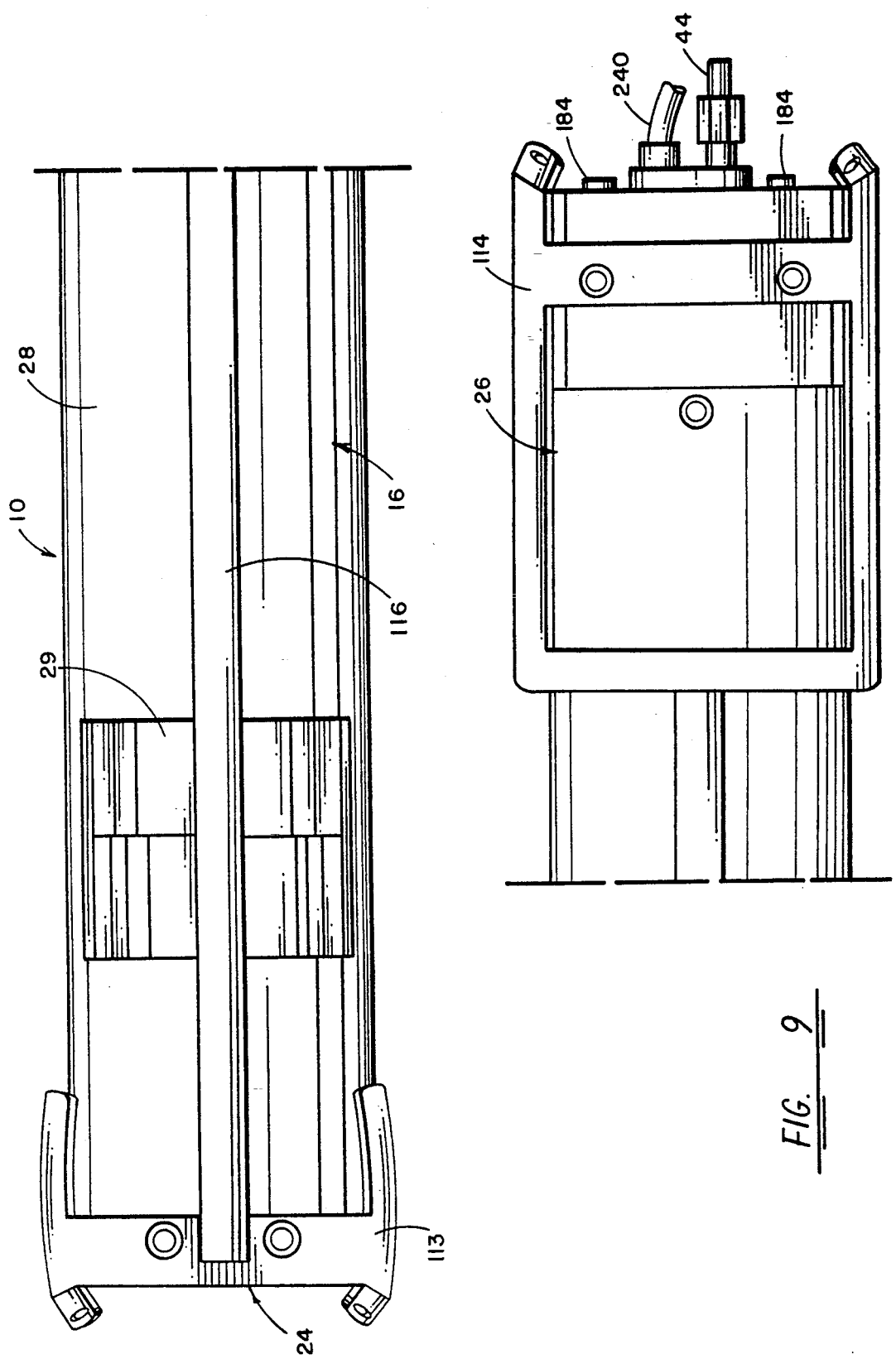
FIG. 9 is a bottom plan view of the cutting apparatus shown in FIG. 2.

Referring to FIGS. 3 and 5, there is shown a air cut motor assembly 34 that slides into enclosure 18 and is coupled to a horizontal shaft 36 having a gear 38 on its distal end. Gear 38 connects to a gear 40 which is attached to a vertical motor shaft 42 that drives cutting head 20. Vertical motor shaft 42 and head 20 have a vertical axis 43 extending therethrough. Referring to FIGS. 2, 3 and 5, air cut motor assembly 34 is activated by air pressure from hose 44 to turn gear 38 and gear 40, thereby rotating cutting head 20 about vertical axis 43.

Disposed on carriage 16 and extending horizontally between inside walls of outer housing 28 is actuator mount 45. Connected between bar 45 and enclosure 18 is linear actuator 46 which urges enclosure 18 and cutting head 20 forward and rearward. Connected with a cotter pin 41 between actuator mount 45 and carriage 16 is linear actuator 48 (FIG. 2). Linear actuator 48 has a piston 49 which expands and contracts to move cutting head 20 vertically within conduit 14.

Referring to FIGS. 2-5, enclosure 18 has grooves 50 and 52 (FIG. 3) disposed on each side. Extending within grooves 50 and 52 are arms 54 and 56 respectively, which extends along outer housing of enclosure 18 from a lift guide rod 58 disposed adjacent the front of carriage 16 to rotation assembly 26 disposed on the rear end of carriage 16. Arm 54 is coupled to arm 56 near the front end of carriage 16 with block 60 having an aperture 62 that receives rod 58. Arms 54 and 56, as well as block 60, vertically slide up and down on rod 58. The vertical movement of block 60, as well as cutting head 20, is controlled by linear actuator 48. Details of this vertical movement will be explained later.

Figure 4:
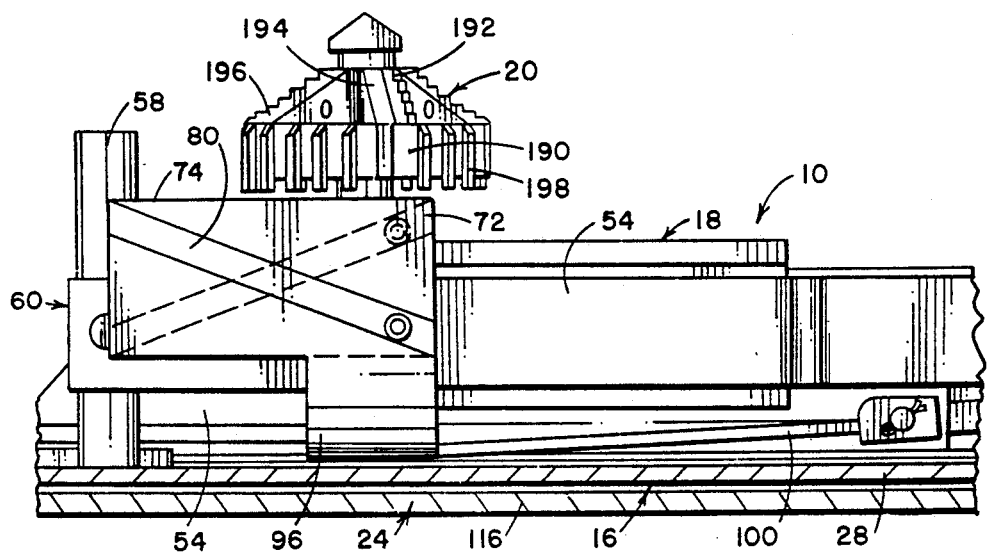
FIG. 4 is a side sectioned view of the cutting apparatus shown in FIG. 2 along cut 4—4.

Referring to FIGS. 2-4, disposed between outer housing 28 and arms 54 and 56 respectively are cams 74 and 78. Cam 74 has first guide channel 72 extending diagonally and originating from the top of cam 74 to the bottom of cam 74 and along the outside surface of cam 74. Extending along the inside surface of cam 74 is a second guide channel 80 originating from the top upper corner of cam 74 and diagonally extending to the lower corner of cam 74. Guide channels 72 and 80 cross in the middle of cam 74. Cam 78 has a first guide channel 76 and second guide channel 88 that extend diagonally in a similar fashion on respective inside and outside surfaces of cam 78. Guide channels 72 and 80 oppose and are reflective of guide channels 76 and 88 respectively.

Referring to FIG. 3, extending outward from arm 54 and arm 56 are connecting rods 64 and 66. Connecting rod 64 and connecting rod 66 have a disk-shaped collar 68 and 70, respectively. Collar 68 extends into second guide channel 80 of cam 74, and a collar 70 extends into first guide channel 76 of cam 78. Extending inward on one side of outer housing 28 into second guide channel 80 is connecting rod 82 and disk-shaped collar 84. Extending inward on outer housing 28 into first guide channel 76 is connecting rod 90 having a disk-shaped collar 92.

Referring to FIGS. 2-5, cam 74 and cam 78 are connected together with semi-cylindrical member 96 extending between enclosure 18 and outer housing 28. Extending rearward from member 90 and connecting with linear actuator 48 is cam arm 100. Piston 48 is urged outward by linear actuator 48 in response to signals from device 218 (see FIG. 10). In response to extender 48 urging piston 49 outward, cam arm 100 pushes semi-cylindrical member 90 and cams 74 and 78 forward to raise cutting head 20. When cams 74 and 78 move frontward and rearward in enclosure 18, connecting rods 82 and 90 remain stationary on outer housing 28, and connecting rods 64 and 66 remain stationary on arms 54 and 56 respectively. Accordingly, as cams 74 and 78 move, collars 68, 70, 84 and 92 move in their respective guide channels forcing enclosure 18, arms 54 and 56, block 60 and cutting head 20 to move up and down (see FIG. 3).

The forward and rearward position of cutting head 20 is controlled by linear actuator 46 which is connected with arm 102 to enclosure 18. Linear actuator 46 is electrically controlled by device 218 (see FIG. 10) and contains a shaft 47 that extends outward in response to electrical signals. When shaft 47 expands outward, enclosure 18 is urged forward and slides on arms 54 and 56. When linear actuator 46 contracts, enclosure 18 moves rearward along arms 54 and 56.

The rotation of cutting head 20 with respect to axis 30 is controlled by rotation assembly 26. Rotation assembly 26 is held in place with skid assembly 24 and piston rods 106 and 108. Referring to FIGS. 2, 5-8, rotation assembly 26 has a front portion 110 and a rear portion 112. Front portion 110 contains 144 a motor to rotate itself with respect to rear portion 112. Piston rods 106 and 108 extend out from rear portion 112 to constrain rear portion 112 in place while front portion 110 rotates, to rotate carriage 16 about axis 30.

The bottom portion of carriage 16 is coupled to skid assembly 24 having a front skid 113 and a rear skid portion 114. Extending between the front skid 113 and the rear skid portion 114 is bar 116. The skid assembly 24 has an extension 117 that is connected to extension 119 on carriage 16 at its front end through shaft 118. Skid assembly 24 is connected to rear portion 112 of rotation assembly 26. As front portion 110 rotates with respect to rear portion 112, carriage 16 rotates on skid assembly 24.

Referring to FIGS. 2 and 5-8, rear portion 112 of tuning assembly 26 includes a plurality of inner disks 120 coupled to disk sprocket 122 and outer disks 124. Extending out of disk sprocket 122 is a rod 126 that extends through inner disks 120 and to an aperture 128 in rear portion 112.

The front portion 110 of tuning assembly 26 includes a disk member 130 that mates with aperture 132 in the center of front portion 110. Front portion 110 has an outer rim 134 having a groove 136 which mates with a cut-out 138. Disposed within cut-out 138 and groove 136 are apertures 140 and 142 respectively which mate with motor 144. Motor 144 has a gear 145 on one end that slides through aperture 140 and 142 into a chamber 146 within front portion 110. Disposed in the side of front portion 110 is aperture 148 which receives horizontal turning assembly 158. Assembly 158 includes ring 150 having an aperture therein.

Horizontal turning assembly 158 includes guide screw 152 extending into the aperture in ring 150. Guide screw 152 has a small rod 154 which mates with cap 156. Horizontal turning assembly 158 extends through aperture 148 into chamber 146. Enclosing horizontal turning assembly 158 is a cap 160 that screws onto the walls of aperture 148 to hold horizontal turning assembly 158 in place. Guide screw 152 has a gear 162 at one end and threads 164 extending along its middle portion. Threads 164 mate with disk sprocket 122 to turn front portion when screw 152 is rotated. Gears 162 mate with gears 145 of motor 144. Accordingly, when motor 144 rotates, gears 145 turn gear 162 to rotate guide screw 152. Threads 164 then rotate to turn disk sprocket 122 thereby turning front portion 110 and carriage 16. Motor 144 is enclosed with cover 170.

Disposed in the side of rear portion 112 are apertures 171 and 172. Aperture 171 contains a piston head assembly 174 generally referred to as a brake assembly or hold mechanism. Screwed into piston head assembly 174 is piston rod 108. Aperture 172 is connected through chamber 178 to a central chamber 180 and rotation assembly 26. Piston head assembly 174 moves inward toward the center of rotation assembly 26 and outward away from the center of rotation assembly 26 in response to air pressure released from and forced into central chamber 180. Optionally disposed on one end of piston rod 108 is prong 182 which extends outward into liner 12 of conduit 14 when piston head assembly 174 moves outward. Additionally disposed on rotation assembly 26 is another piston assembly 186, also having a corresponding screw and optionally having a prong (not shown), which extends outward when pressurized air is forced into central chamber 180. The air in central chamber 180 is fed to enclosure 18 to pneumatically turn air out motor assembly 34 and drive cutting head 20. Air is discharged from air cut motor assembly 34 through an air discharge hose connected to the back of the motor, through rotation assembly 26 and out through two filtered exhaust ports 184. Piston head assemblies 174 and 186 expand outward only when air cut motor assembly 34 is enabled.

Referring to FIGS. 2 and 4, cutting head 20 includes an outer ring 190 and an inner ring 192. Extending between outer ring 190 and inner ring 192 are a plurality of connecting bars 194. Disposed in a line 191 from said outer ring 190 to said inner ring 192 on top of connecting bar 194 are a plurality of second cutting bars 196. Preferably the second cutting bars 196 have a top surface with an edge that is at an acute angle to the line. Also disposed around the perimeter of outer ring 190 are cutting bars 198 which extend slightly above the top surface and slightly below the bottom surface of outer ring 190. Inner ring 192 is female keyed on its bottom portion and mates with a male key on vertical motor shaft 42. Vertical motor shaft 42 extends upward through void 204 in cutting head 20 and screwably mates with cutting tip 202. It is preferable that cutting bars 196-198 and cutting tip 202 be constructed from a carbide material. A cutting tip 202 screws onto rod 200. Cutting tip 202 bottom portion has an aperture that aligns with an aperture extending through inner ring 192. A cotter pin may then be extended through both apertures in inner ring 192 and cutting tip 202 to hold cutting tip 202 in place.

Connecting bars 194 are evenly spaced and extend between inner ring 192 and outer ring 190. Apertures are formed between inner ring 192, outer ring 190 and connecting bars 194. Thus, when cutting tip 202 contacts liner 12 particles may fall through aperture 29, downward and out an aperture 29 (see FIG. 9) on the bottom of cutting apparatus 10.

Figure 10:
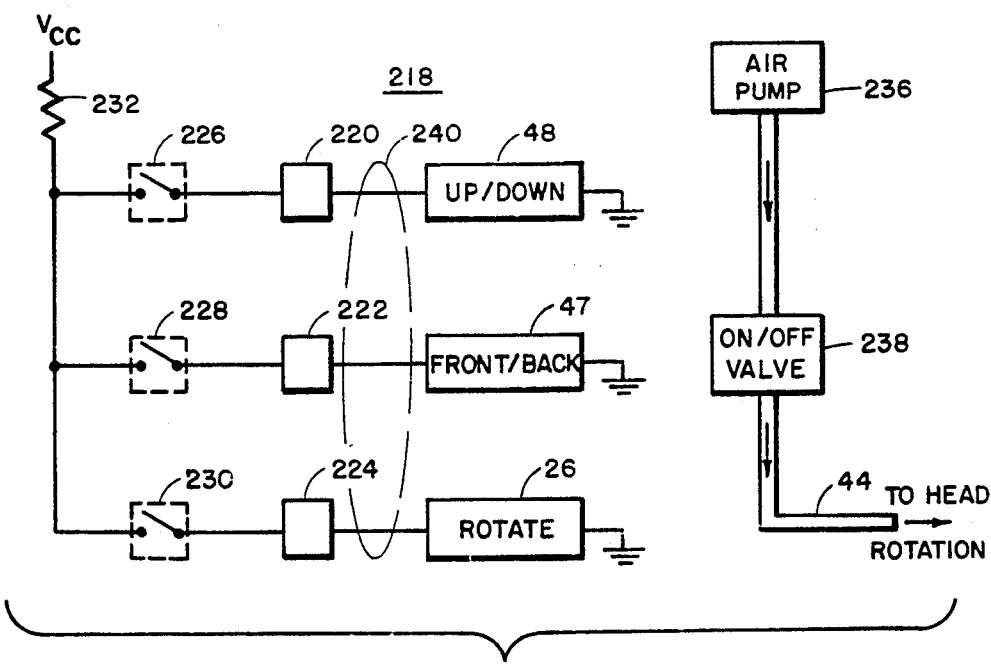
FIG. 10 is a simplified schematic diagram of the electronics used to operate the cutting apparatus.

Referring to FIG. 10 there is shown an electrical schematic of a device 218 for controlling the cutting apparatus 10. Extender assemblies 46 and 48, and rotation assembly 26 are connected through a respective current sensor cutoff, 220, 222 and 224 to a respective switch 226, 228 and 230. Each switch 226, 228 and 230 is coupled through cable 240 to enable respective linear actuators 46 and 48 or rotation assembly 26. Switches 226, 228 and 230 are connected through a variable resistor 232 to a power source. Variable resistor 232 controls the speed at which extender assemblies 46 and 48 or rotation assembly 26 operate. A distinguishing feature about this control circuit is that one or more switches may of the extender assemblies 46 and 48 or rotation assembly 26. Accordingly, cutting apparatus 10 may rotate cutting head 20 while at the same time elevate and move it forward.

Also shown in FIG. 10 is air pump 236 connected through an on/off valve 238 and hose 44 to rotation assembly 26 and air cut motor assembly 34. Air pump 236 is preferably a very high compression air pump to allow air cut motor assembly 34 to rotate cutting head 20 at high speeds. On/off valve 238 enables and disables air to air cut motor assembly 34 as well as piston head assembly 174 and piston assembly 186.

This concludes the description of the preferred embodiments. A reading by those skilled in the art will bring to mind various changes without departing from the spirit and scope of the invention. It is intended, however, that the invention only be limited by the following appended claims.

What is claimed is:

1. A cutting head comprising:
    a ring having an outer perimeter surface, a top surface, and a center axis;
    a first plurality of elongated cutting bars embedded in the outer perimeter of said ring, said cutting bars extending radially outward from the surface of said outer perimeter;
    a cutting tip disposed in the center of the axis and extending longitudinally above the top surface; and
    a second plurality of spaced elongated cutting bars extending radially outward from said axis to said ring, said second plurality of bars having a cutting surface with a positive incline, and said cutting surface extends from said top surface of said ring to said cutting tip.

2. The cutting head as recited in claim 1 wherein said second plurality of bars directly contacts said ring.

3. A cutting head comprising:
    an outer ring having a plurality of first cutting bars embedded in the outside perimeter of said ring, said cutting bars extending outward from said ring perimeter and extending upward above said ring top surface;
    an inner ring having a top surface with a level above said outer ring top surface, said inner ring encircling a void;
    a plurality of connecting bars having a top surface extending from said outer ring's top surface to said inner ring's top surface;
    a plurality of second cutting bars embedded in the connecting bars top surface, and being disposed along a line extending from said inner ring to said outer ring; and
    a rod coupled to said inner ring and having a cutting tip on one end, said rod being disposed in the void of said inner ring and said cutting tip extending above said inner ring's top surface.

4. The cutting head as recited in claim 3 wherein said inner ring includes means for removably coupling said rod to said inner ring.

5. The cutting head as recited in claim 3 wherein said connecting bars are integrally connected to said inner and outer ring.

6. The cutting head as recited in claim 5 wherein said cutting tip, said first cutting bars and said second cutting bars are constructed from carbide steel.

7. The cutting head as recited in claim 6 wherein said outer ring, inner ring and said connecting bar are constructed with hardened tool steel.

8. The cutting head as recited in claim 7 wherein said carbide steel is welded to said hardened tool steel with silver solder.

9. The cutting head as recited in claim 3 wherein said second cutting bars have a top surface with an edge that is oriented at an acute angle to said line.

10. A cutting head comprising:
    a ring having an outer perimeter surface, a top surface, a bottom surface, and a center axis;
    a first plurality of elongated cutting bars embedded in the outer perimeter of said ring, said cutting bars extending radially outward from the surface of said outer perimeter between said ring top surface and said ring bottom surface;
    a cutting tip disposed in the center of the axis and extending longitudinally above the top surface; and
    a second plurality of spaced cutting bars extending radially outward from said axis between said cutting tip and said ring, said second plurality of bars being positioned along a positive incline extending from said top surface of said ring toward said cutting tip.

11. The cutting head as recited in claim 10 wherein all of said first elongated cutting bars are positioned along the outside perimeter of said ring at substantially even radial intervals and wherein all of said first elongated cutting bars embedded in said ring extend radially outwardly away from said ring at substantially the same distance.

12. The cutting head as recited in claim 1 wherein said second plurality of cutting bars are radially spaced from said axis at substantially evenly spaced intervals from said cutting head.

13. The cutting head as recited in claim 10 wherein said first and second plurality of cutting bars are constructed with carbide steel, and said ring is constructed with machine steel.

14. The cutting head as recited in claim 10 wherein said first elongated plurality of cutting bars extend substantially along the entire width of the ring from said ring top surface to said ring bottom surface.

15. The cutting head as recited in claim 10 wherein said first plurality of elongated cutting bars have a rectangular outer surface which contacts said ring and extends between said top and bottom surface of said ring substantially along the entire width of said ring.

16. The cutting head as recited in claim 10 wherein said cutting head includes means for disengaging said tip from said second plurality of cutting bars and said ring.

* * * * *